United States Patent
Iketani (10) Patent No.: US 7,311,308 B2
(45) Date of Patent: *Dec. 25, 2007

(54) SEAL DEVICE FOR WATER PUMP, ROTATION SUPPORTING DEVICE FOR WATER PUMP AND ASSEMBLY METHOD FOR WATER PUMP

(75) Inventor: Masamichi Iketani, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/964,810

(22) Filed: Oct. 15, 2004

(65) Prior Publication Data

US 2005/0104299 A1    May 19, 2005

Related U.S. Application Data

(63) Continuation of application No. PCT/JP03/05013, filed on Apr. 18, 2003.

(30) Foreign Application Priority Data

Apr. 23, 2002    (JP)    ................ 2002-120719

(51) Int. Cl.
*F16J 15/34*    (2006.01)
*F16J 15/32*    (2006.01)
*B23P 19/12*    (2006.01)

(52) U.S. Cl. .................. 277/551; 277/371; 277/562; 29/235; 29/428

(58) Field of Classification Search .......... 277/370, 277/371, 551, 562; 29/235, 402.02, 428
See application file for complete search history.

(56) References Cited

U.S. PATENT DOCUMENTS

| | | | | | |
|---|---|---|---|---|---|
| 3,032,346 | A | * | 5/1962 | Sullivan | 277/565 |
| 4,114,898 | A | * | 9/1978 | Bainard et al. | 277/551 |
| 4,208,057 | A | * | 6/1980 | Messenger | 277/309 |
| 4,434,985 | A | * | 3/1984 | Sonnerat | 277/353 |
| 4,525,082 | A | * | 6/1985 | Brandenstein et al. | 384/138 |
| 4,531,748 | A | * | 7/1985 | Jackowski | 277/551 |
| 4,550,486 | A | * | 11/1985 | Yarimizu | 29/451 |
| 4,768,923 | A | * | 9/1988 | Baker | 415/230 |
| 5,052,695 | A | * | 10/1991 | Curtis | 29/235 |
| 5,709,018 | A | * | 1/1998 | Dugan | 29/235 |
| 6,003,871 | A | * | 12/1999 | Poll | 277/309 |
| 6,065,198 | A | * | 5/2000 | Vitous et al. | 29/258 |
| 6,149,158 | A | * | 11/2000 | Tripathy | 277/307 |

(Continued)

FOREIGN PATENT DOCUMENTS

JP    HEI 8-254213    10/1996

(Continued)

*Primary Examiner*—Alison K Pickard
(74) *Attorney, Agent, or Firm*—Crowell & Moring LLP (57) ABSTRACT

The tip edge of a second seal lip of an elastic member constituting a seal ring is in sliding contact with an outside face of a slinger. The seal ring and the slinger are pre-assembled and then installed between an inner peripheral surface at an end of an outer ring and the middle of an outer peripheral surface of a rotating shaft. The first and second seal lips are protected by the slinger prior to assembly. As a result, the first and second seal lips constituting the seal ring installed with the slinger can be installed without damage, using an industrial method.

2 Claims, 8 Drawing Sheets

U.S. PATENT DOCUMENTS

| | | | |
|---|---|---|---|
| 6,370,751 B1 * | 4/2002 | Rullmann et al. | 29/235 |
| 6,481,896 B1 * | 11/2002 | Ohtsuki et al. | 384/484 |
| 6,485,256 B1 * | 11/2002 | Iketani | 415/113 |
| 6,669,373 B2 * | 12/2003 | Ohtsuki et al. | 384/486 |
| 7,066,467 B2 * | 6/2006 | Sakata | 277/351 |
| 2003/0184021 A1 * | 10/2003 | Hatch et al. | 277/395 |

FOREIGN PATENT DOCUMENTS

| | | |
|---|---|---|
| JP | 9-21396 | 1/1997 |
| JP | 9-229954 | 9/1997 |
| JP | 10-110895 | 4/1998 |
| JP | 11-153098 | 6/1999 |
| JP | 2001-215132 | 8/2001 |
| WO | WO 03/023231 | 3/2003 |
| WO | WO 03/083330 A2 * | 10/2003 |
| WO | WO 03/091574 A1 * | 11/2003 |

\* cited by examiner

SEAL DEVICE FOR WATER PUMP, ROTATION SUPPORTING DEVICE FOR WATER PUMP AND ASSEMBLY METHOD FOR WATER PUMP

TECHNICAL FIELD

A method of assembly for a seal apparatus for a water pump, a rotation support apparatus for a water pump, and a water pump according to the present invention relates to an improvement of a method of assembly for a seal apparatus for a water pump that is used for circulating coolant water for an automobile engine.

BACKGROUND ART

Figure 10:
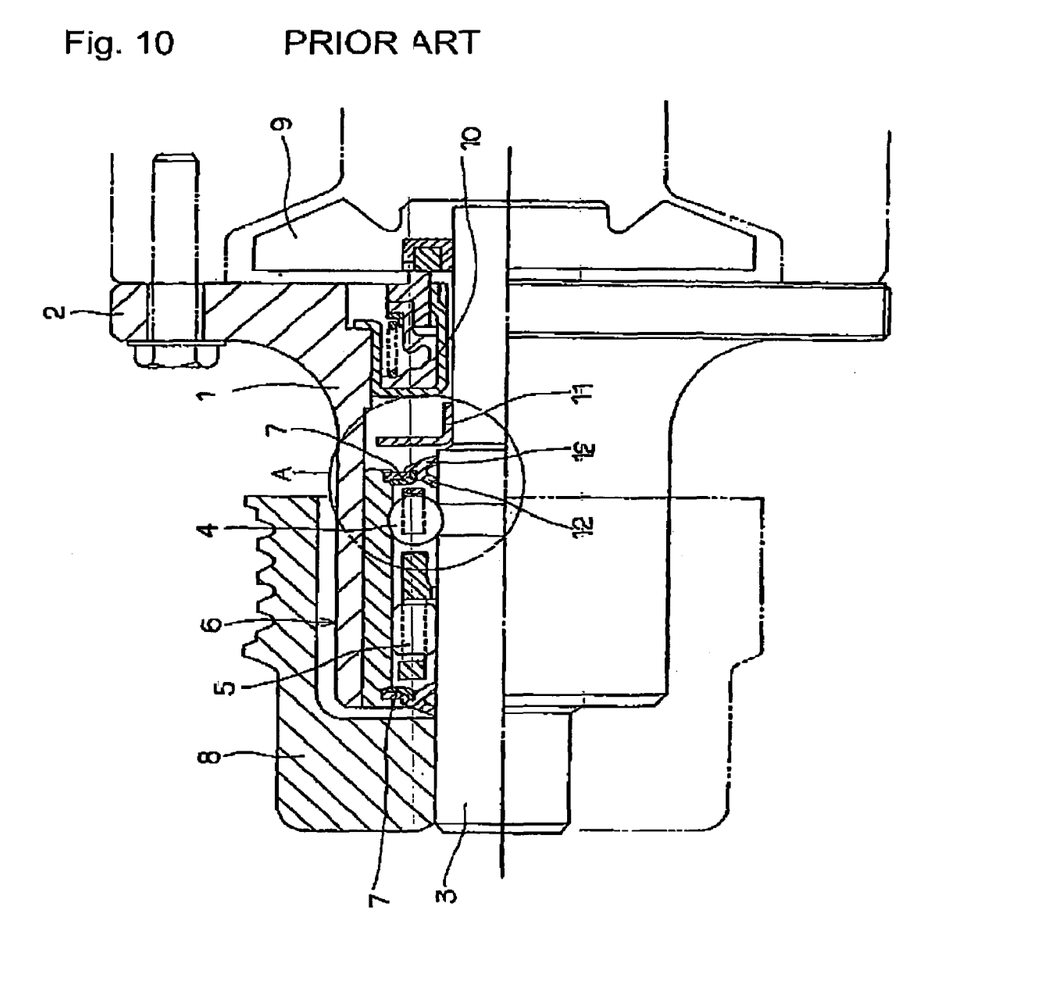
FIG. 10 is a cross-sectional view showing a first example of a conventional water pump.

A water pump used for circulating coolant water for an automobile engine is disclosed for example in Japanese Patent Publication No. Tokukai Hei 8-254213, and is constructed as shown in FIG. 10. A cylindrical housing 1 has a mounting flange 2 formed around its outer peripheral surface on the inside end (the inside with reference to the axial direction is the side nearest the engine, and is the right side in all of the figures) which is used for fastening to the cylinder block of the engine. A rolling bearing unit 6 comprising a ball bearing 4 on the inside and a roller bearing 5 on the outside (the outside with reference to the axial direction is the side furthest from the engine, and is the left side in all of the figures) in combination to rotatably support a rotating shaft 3, is provided on the inner diameter side of the housing 1. Seal rings 7, 7 are located on both ends in the axial direction (left and right direction in FIG. 10) of this rolling bearing unit 6 to prevent leakage of grease filled inside the bearing unit, as well as to prevent entry of foreign matter such as dirt or steam from the outside. Moreover, a pulley 8 is fastened to a section on the outside end of the aforementioned rotating shaft 3 protruding from the opening on the outside end of the housing 1.

When installed in the engine, a belt (not shown in the figure) is placed around this pulley 8 to rotate and drive the aforementioned rotating shaft 3 through the crankshaft of the engine. On the other hand, an impeller 9 is fastened to a section on the inside end of the rotating shaft 3 protruding from the inside surface of the mounting flange 2. When this mounting flange 2 is fastened to the cylinder block of the engine, the aforementioned impeller 9 fits inside the water jacket formed within the cylinder block. With rotation of the rotating shaft 3, the cooling water in the water jacket circulates to and from a radiator (not shown in the figure) or the like.

Furthermore, a mechanical seal 10 is provided between the outer peripheral surface of the rotating shaft 3 and the inner peripheral surface of the housing 1. When the engine is operating, this mechanical seal 10 allows rotation of the rotating shaft 3 while preventing leakage of steam or coolant water flowing inside the water jacket, to the outside. However, it is difficult to obtain a perfect seal with the aforementioned mechanical seal 10, and generation of frictional heat at the seal surface of this mechanical seal 10 results in evaporation of the coolant water containing chemical matter such as anti-freeze agents or anti-rust agents, forming steam, and leakage toward the rolling bearing unit 6, while at the same time, the coolant water wherein the aforementioned chemical matter is condensed due to evaporation also leaks out to the rolling bearing unit 6 side. Therefore a slinger 11 is located in the middle section of the rotating shaft 3 between the mechanical seal 10 and the inside seal ring 7, and a supply-discharge hole (not shown in the figure) is formed in the middle of the housing 1 in the section facing the outer peripheral edge of the slinger 11 to allow unrestricted discharge of steam or hot water leaking from the mechanical seal 10, to the outside of the housing 1. In other words, the aforementioned supply-discharge port communicates between the outside and a space which is provided between the mechanical seal 10 and the inside seal ring 7 in the axial direction to function as a steam chamber, so that steam and hot water in this space are discharged freely to the outside.

In the first example of the conventional construction shown in FIG. 10, the inner peripheral edges of a pair of seal lips 12, 12 forming the inside seal ring 7 come into sliding contact around the entire periphery of the outer peripheral surface of the middle section of the rotating shaft 3. Moreover, the inside seal ring 7 and the slinger 11 are not associated with, and are independent of, each other.

Figure 11:
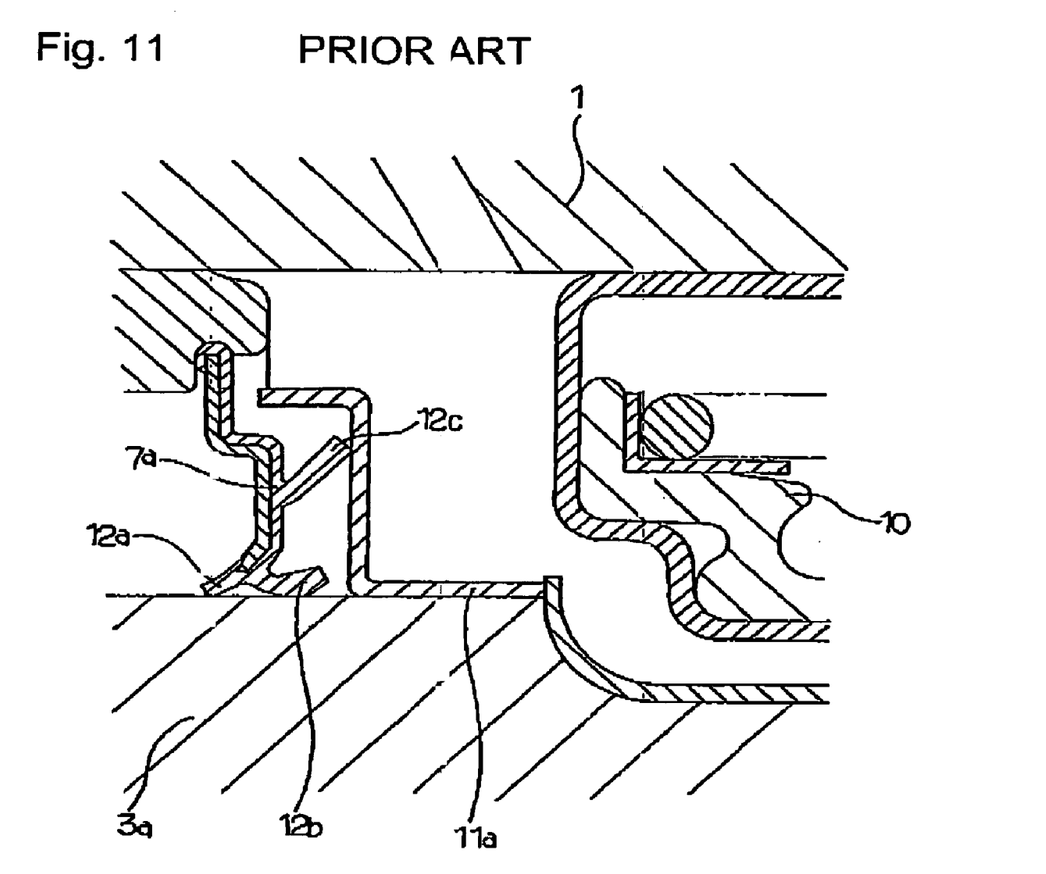
FIG. 11 is a cross-sectional view showing a second example of a conventional water pump.

On the other hand, Japanese Patent Publication No. Tokukai Hei 11-153096 discloses, as shown in FIG. 11, a construction for improving seal performance by locating a seal ring 7a and a slinger 11a such that they are associated with each other. In the case of this construction, two of three lips 12a, 12b and 12c constituting the seal ring 7a, specifically the seal lips 12a and 12b, come into sliding contact around the entire periphery of the outer peripheral surface of the rotating shaft 3a. On the other hand, the tip edge of the remaining seal lip 12c comes into sliding contact around the entire periphery of the outside surface of the slinger 11a. With this kind of construction, the seal performance is improved in comparison to that of the first example of the conventional construction shown in FIG. 10, and it is possible to more effectively prevent foreign matter such as steam or hot water from entering the rolling bearing unit supporting the rotating shaft 3a.

In the case of the second example of the construction shown in FIG. 11, the seal performance is better than that of the first example of the construction shown in FIG. 10. However in order to effectively prevent foreign matter from entering the bearing unit over a long period of time, further improvement is desired. In other words, in Japanese Patent Publication No. Tokukai Hei 11-153096 wherein the construction as shown in FIG. 11 is disclosed, only a construction wherein the tip edge of one of the three seal lips 12a, 12b, and 12c forming the seal lip 7a, specifically the seal lip 12c, is in sliding contact with the outside surface of the slinger 11 is disclosed, but no detailed specifications are disclosed.

On the other hand, in order to effectively prevent entry of foreign matter into the bearing unit over a long period of time, it is necessary to satisfy the following conditions (1) and (2).

(1) The tip edge of the seal lip 12c must come into sliding contact around the entire periphery of the outside surface of the slinger 11a without gaps and with sufficient pressure.

(2) Wear of the tip edge of the seal lip 12c due to rubbing with the outside surface of the slinger 11a must be minimized.

If only condition (1) above is to be satisfied, it is only necessary to increase the amount of elastic deformation of the seal lip 12c and increase the force pressing the tip edge of the seal lip 12c against the outside surface of the slinger 11a. On the other hand, if only condition (2) above is to be satisfied, it is only necessary to reduce the amount of elastic deformation of the seal lip 12c and reduce the force pushing the tip edge of the seal lip 12c against the outside surface of the slinger 11a.

Since the condition (1) above for securing the seal performance is counter to the condition (2) above for securing durability, it is important to implement a specific construction to effectively prevent entry of foreign matter over a long period of time, and to obtain a method of assembly of that construction providing a satisfactory yield with an industrial method.

The methods of assembly for the seal apparatus for a water pump, the rotation support apparatus for a water pump, and the water pump of the present invention has been invented in consideration of the aforementioned situation.

DISCLOSURE OF THE INVENTION

In the methods of assembly for a seal apparatus for a water pump, a rotation support apparatus for a water pump, and a water pump of the present invention, the seal apparatus for a water pump to which the method of assembly according to a first and second aspect is applied comprises; a seal ring having an outer peripheral edge thereof fastened to an inner peripheral surface of a non-rotating member, and a slinger fitted onto a rotating shaft of the water pump and passing through the non-rotating member, so as to block a space between the inner peripheral surface of the non-rotating member and an outer peripheral surface of the rotating shaft. Furthermore, the seal ring has a seal lip in sliding contact with one side face of the slinger. Moreover, in the case of the seal apparatus for a water pump to which covered by the method of assembly according to a second aspect is applied, the seal ring has a first seal lip in sliding contact with an outer peripheral surface of the rotating shaft or of a slinger that rotates together with the rotating shaft, and a second seal lip in sliding contact with one side face of the slinger.

Furthermore, the rotation support apparatus for a water pump to which the method of assembly according to a third aspect is applied comprises: an outer ring having an outer ring raceway on an inner peripheral surface; a rotating shaft constituting the water pump and having an inner ring raceway on an outer peripheral surface; a plurality of rolling elements provided between the outer ring raceway and the inner ring raceway such that they can rotate freely; a seal ring having an outer peripheral edge fastened to an inner peripheral surface on an end of the outer ring; and a slinger fitted onto the rotating shaft. Moreover, the seal ring has a first seal lip in sliding contact with an outer peripheral surface of the rotating shaft or of the slinger, and a second seal lip in sliding contact with one side face of the slinger.

Furthermore, the water pump to which the method of assembly according to a fourth aspect comprises is applied: a housing; an outer ring raceway provided directly on an inner peripheral surface of the housing or via a separate outer ring; a rotating shaft having an inner ring raceway on an outer peripheral surface thereof; a plurality of rolling elements provided between the outer ring raceway and the inner ring raceway such that they can roll freely; a seal ring having an outer peripheral edge thereof fastened to an inner peripheral surface on one end of the outer ring; a slinger fitted onto the rotating shaft; a pulley secured to an outer end of the rotating shaft; an impeller secured to an inner end of the rotating shaft; a mechanical seal provided at a section axially between the impeller and the slinger, between the inner peripheral surface of the housing and the outer peripheral surface of the rotating shaft; and a space provided axially between the mechanical seal and the seal ring. Moreover, the seal ring has a first seal lip in sliding contact with an outer peripheral surface of the rotating shaft or of the slinger, and a second seal lip in sliding contact with one side face of the slinger.

Furthermore, in the case of the seal apparatus for a water pump, the rotation support for a water pump, and the water pump to which the method of assembly of the present invention is applied, the amount of compression of the seal lip or the second seal lip associated with contact of a tip edge of the seal lip or the second seal lip against the one side face of the slinger, is made at least $1/10$ and up to $7/10$ of the height of the seal lip or of the second seal lip in a free condition. In addition, the roughness of a portion at one side face of the slinger in sliding contact with the tip edge of the seal lip or of the second seal lip is made an arithmetic mean roughness Ra from 0.2 μm to 2.0 μm, or a maximum height Ry from 0.8 μm to 8.0 μm.

Preferably, the amount of compression of the seal lip or of the second seal lip is at least $2/10$ and up to $5/10$ the height of the seal lip or of the second seal lip in the free condition, and even more preferably at least $2/10$ and up to $3/10$ the height in the free condition.

Moreover, the cross-sectional shape of the seal lip or of the second seal lip is preferably such that it is increasingly tilted out in the radial direction as it becomes closer to the tip edge, and more preferably is a wedge shape wherein the width (thickness) dimension becomes smaller from the base end to the tip end. At the same time, the length dimension of the seal lip or the second seal lip is at least two times the average thickness dimension of the seal lip or the second seal lip, and preferably at least 2.5 times.

Furthermore, in all cases, the seal ring is manufactured by injection of a material (elastic material) into a cavity in a mold. The hardness of the seal lip or the second seal lip of the seal ring (preferably also the hardness of the first seal lip) is a Shore hardness of between Hs50 and Hs90.

When assembling the seal apparatus for a water pump, the rotation support for a water pump, and the water pump of the present invention as described above, the seal ring and the slinger are pre-assembled beforehand for assembly between the inner peripheral surface of the non-rotating member (including the outer ring or housing) and the outer peripheral surface of the rotating shaft, and then installed in this assembled condition between both peripheral surfaces.

Moreover, it is preferable that prior to assembly (or during assembly) of the seal ring and slinger, grease be applied to part of the seal ring.

According to the method of assembly for the seal apparatus for a water pump, the rotation support for a water pump, and the water pump, manufactured in accordance with the method of assembly of the present invention as described above, it is possible to effectively prevent entry of foreign matter into the rolling bearing unit that supports the rotating shaft of the water pump over a long period of time.

In particular, according to the method of assembly of the present invention, it is possible to prevent adherence of foreign matter to the seal lip or the second seal lip, or damage and the like to the seal lip or the second seal lip, during assembly, and to manufacture stably and at low cost the seal apparatus for a water pump, the rotation support for a water pump, and the water pump, having a stable sealing performance.

BRIEF DESCRIPTION OF THE DRAWINGS

FIG. 9(A) through FIG. 9(D) are partial cross-sectional views showing four examples of pre-assembled seal rings and slingers with grease applied.

BEST MODE FOR CARRYING OUT THE INVENTION

Figure 1:
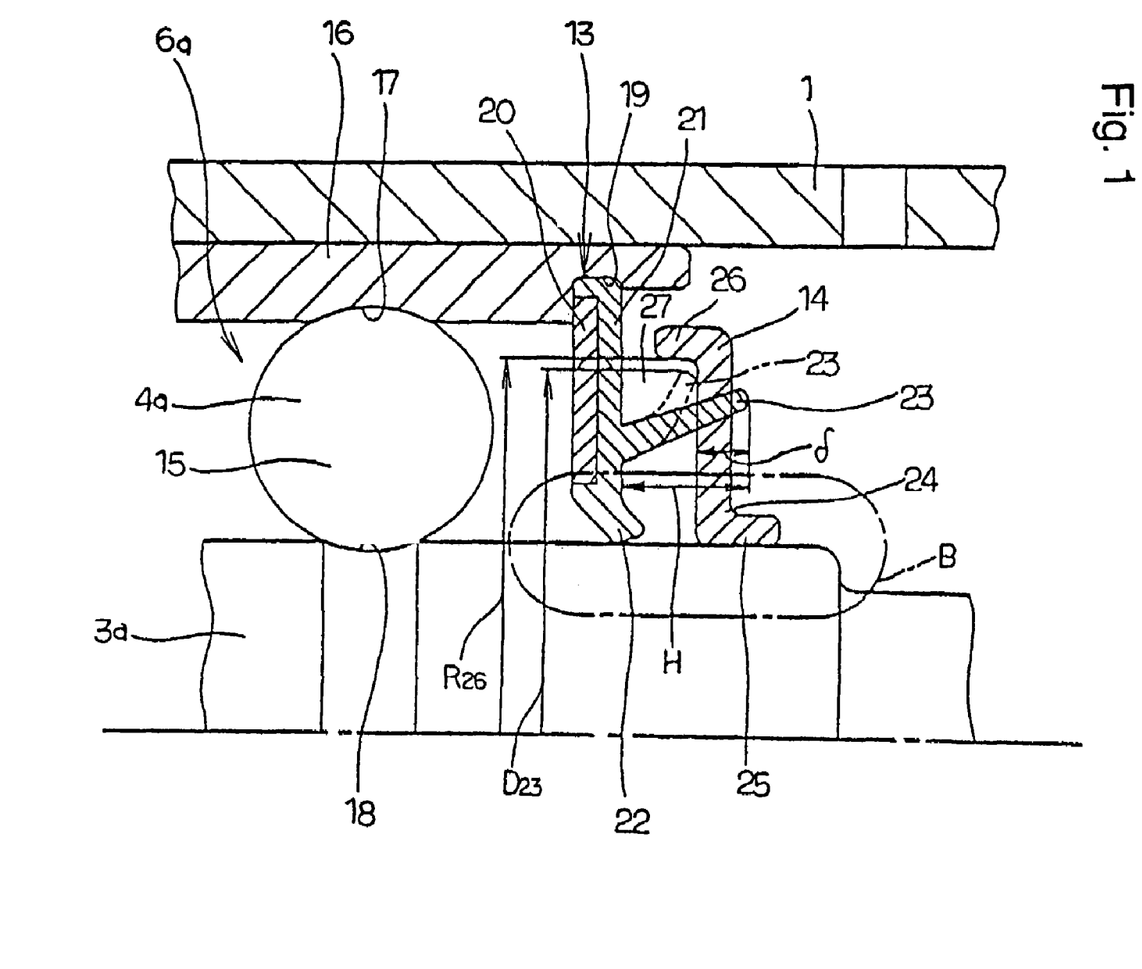
FIG. 1 is a partial cross-sectional view showing a first example of a construction covered by the method of assembly of the present invention, corresponding to portion A of FIG. 10.

FIG. 1 shows a first example of the construction of a seal apparatus for a water pump covered by the method of assembly of the present invention. The characteristic of the seal apparatus for a water pump to which the method of assembly of this example is applied is that, by suitable regulation of the shape and dimensions of the seal ring 13 and slinger 14 provided in the middle section of the rotating shaft 3a further toward the outside than the mechanical seal 10 (see FIG. 10), it is difficult for steam or hot water passing through the mechanical seal 10 to enter the rolling bearing unit 6a including the plurality of rolling elements (balls) 15. Since the overall construction and the like of the water pump, and the construction and operation of other sections are substantially the same as for a conventional water pump, including the construction shown in FIG. 10, drawings and explanations of identical sections are omitted or simplified, and the explanation will concentrate on sections that are features of the seal apparatus for a water pump covered by the method of assembly of the present invention, and sections not previously explained.

In order to construct the ball bearing 4a which forms part of the aforementioned rolling bearing unit 6a, the rolling elements 15 are held by a retainer (not shown in the figures), and in such a manner as to enable free rotation, between a deep groove-shaped outer ring raceway 17 formed around the inner peripheral surface of an outer ring 16a, and a deep groove-shaped inner ring raceway 18 formed around the outer peripheral surface of the rotating shaft 3a. Also, the outer peripheral edge of the seal ring 13 is fastened to an attachment groove 19 formed around the entire inner peripheral surface on the inside end of the outer ring 16. This seal ring 13 comprises a circular metal core 20 and an elastic member 21 made of an elastomer such as rubber reinforced by the circular metal core 20. In the example shown in the figures, the outer peripheral edge of this elastic member 21 protrudes further outward in the radial direction than the outer peripheral edge of the metal core 20, and this outer peripheral edge of the elastic member 21 is fastened to the attachment groove 19. However, it is also possible to expose the metal core 20 at the outer peripheral edge of the seal ring 13, and to fasten this metal core 20 to the aforementioned attachment groove 19.

The elastic member 21 comprises a first seal lip 22 that comes into sliding contact with the outer peripheral surface of the rotating shaft or of the slinger, and a second seal lip 23 equivalent to the aforementioned seal lip that comes into sliding contact with one side face of the slinger. Of these, the first seal lip 22 forms the inner peripheral edge of the seal ring 13, and it therefore comes into sliding contact around the entire circumference of the outer peripheral surface of the middle section of the rotating shaft 3a. In other words, the inner diameter of the first seal lip 22 in the free condition is slightly smaller than the outer diameter of the middle section of the rotating shaft 3a, and when the rotating shaft 3a is passed through the inner diameter side of the first seal lip 22, the inner peripheral edge of this first seal lip 22 comes in elastic contact around the outer peripheral surface of the middle section of the rotating shaft 3a around the entire circumference.

On the other hand, the second seal lip 23 extends to inwards from the side face of the elastic member 21 such that it is increasingly tilted out in the radial direction towards to the tip edge. The cross-sectional shape of this second seal lip 23 is a wedge shape where the width (thickness) dimension becomes smaller from the base toward the tip. At the same time, the length dimension of the second seal lip 23 is such that it is at least two times and preferably at least 2.5 times the average thickness of the second seal lip 23. The tip edge of this second seal lip 23 comes into sliding contact around the outside surface of the slinger 14 around the entire circumference. This outside surface of the slinger 14 is the one side face disclosed in the claims and set forth later. In this condition, the second seal lip 23 is bent (curled) such that it has a circular arc-shaped cross section.

The aforementioned slinger 14 fitted onto and fastened to the middle section of the rotating shaft 3a in the section adjacent to the inside of the seal ring 13, is made of anti-corrosive metal plate such as stainless steel plate or steel plate to which anti-corrosion surface treatment has been applied such that at least the surface where the tip edge of the second seal lip 23 comes into sliding contact does not corrode, and is formed by bending it generally into a ring shape having a crank-shaped cross section. In other words, the slinger 14 comprises: an inner diameter side cylindrical section 25 formed by bending at a right angle the inner peripheral edge of the circular section 24 to the inside in the axial direction; and an outer diameter side cylindrical section 26 similarly formed by bending at a right angle the outer peripheral edge of the circular section 24 to the outside in the axial direction. By tightly fitting the inner diameter side cylindrical section 25 onto the middle section of the rotating shaft 3a with an interference fit, the slinger 14 is fastened around the outer peripheral surface of the middle section of the rotating shaft 3a. Also, the tip end of the second seal lip 23 comes into sliding contact around the outside surface of the slinger 14 around the entire circumference. The roughness of the outside surface of the slinger 14, against which the tip edge of the second seal lip 23 comes into sliding contact in this manner, is such that the arithmetic mean roughness Ra is from 0.2 μm to 2.0 μm, or the maximum height Ry is from 0.8 μm to 8.0 μm.

In the case of the seal apparatus for a water pump to which the method of assembly of the present invention is applied, by suitably regulating the distance between the seal ring 13 and the slinger 14, the amount of compression δ of the second seal lip 23 (amount of elastic compression in the radial direction from the free condition) when assembled as shown by the dot-dash line in FIG. 1 is at least 1/10 and up to 7/10 the height H of the second seal lip 23 in the free condition as shown by the solid line in the figure (H/10 $\leq \delta \leq$ 7H/10). Preferably, this amount of elastic deformation δ should be at least 2/10 and up to 5/10 the height of the second seal lip 23 in the free condition (2H/10$\leq \delta \leq$5H/10), and even more preferably at least 2/10 and up to 3/10 (2H/10$\leq \delta<$3H/10). Furthermore, the inner diameter $R_{26}$ of the outer diameter side cylindrical portion 26 provided on the outer peripheral edge of the slinger 14 is larger than the outer diameter $D_{23}$ of the second seal lip 23 under elastic deformation ($R_{26}>D_{23}$), so that there is no interference or rubbing between the tip edge of the second seal lip 23 and the inner peripheral surface of the outer diameter side cylindrical portion 26.

Figure 2:
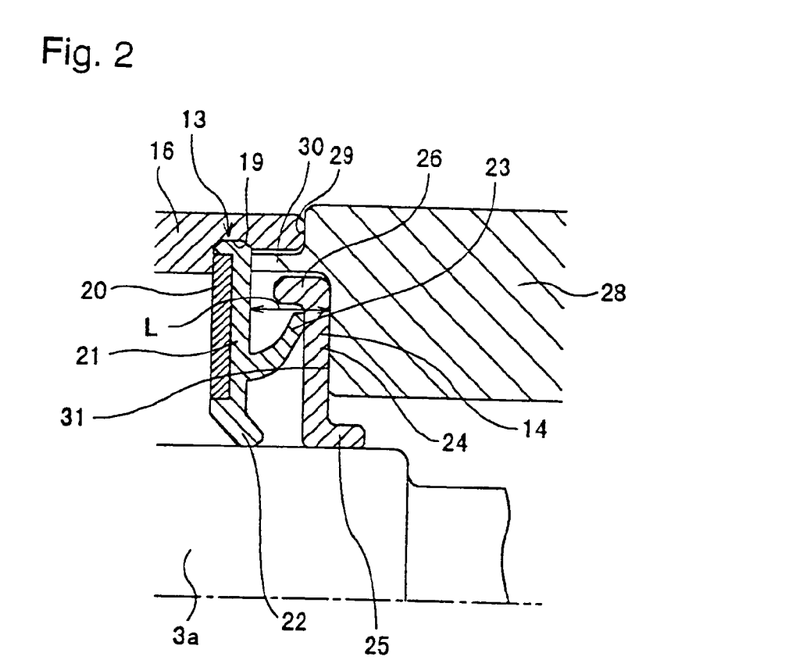
FIG. 2 is a partial cross-sectional view showing a first example of an embodiment of the method of assembly of the present invention.
Figure 3:
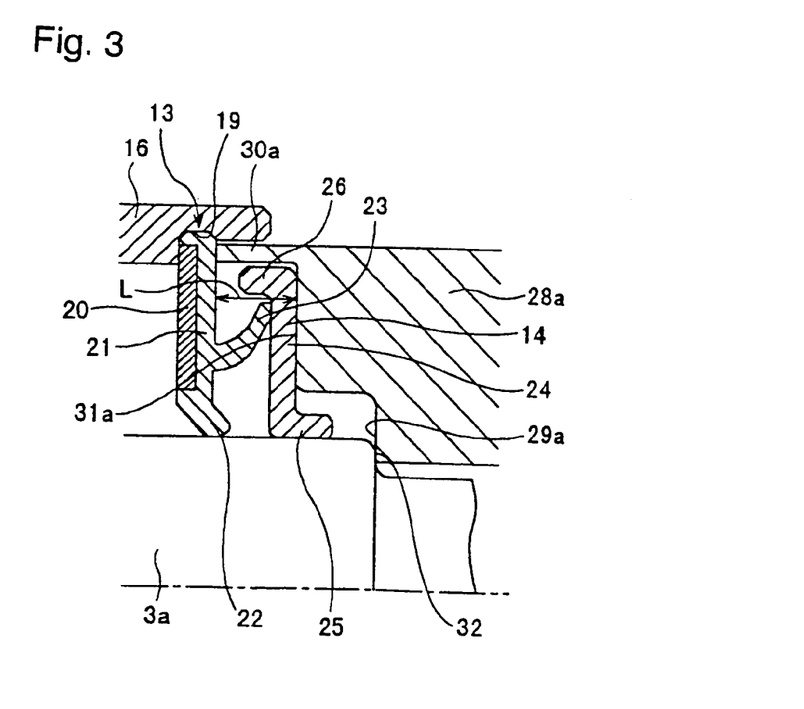
FIG. 3 is a partial cross-sectional view showing a second example of an embodiment of the method of assembly of the present invention.

Next, two examples of the method of assembly for the seal apparatus for a water pump as shown above are explained with reference to FIG. 2 and FIG. 3. The reason for adopting the method of assembly shown in FIG. 2 and FIG. 3 is to prevent adhesion of foreign matter such as dust and the like to the first seal lip 22 and the second seal lip 23, prior to completing assembly, and to prevent the occurrence of damage such as scratching of these seal lips 22 and 23, and also to strictly regulate the amount of compression δ of the second seal lip 23 in the assembled condition. In other words, with the seal apparatus for a water pump assembled with the method of assembly of the present invention, it is possible over a long period of time to sufficiently prevent entry of foreign matter into the rolling bearing unit by regulating the amount of elastic deformation of the second seal lip 23. Preventing adhesion of foreign matter such as dust and the like to, and damage to, the seal lips 22 and 23 is therefore necessary in order to obtain the required seal performance. Furthermore, it is important to fit the slinger 14 onto, and fasten it to, the rotating shaft 3a while regulating the position in the axial direction of the slinger 14 in sliding contact with the tip edge of the second seal lip 23.

Therefore, when fitting the slinger 14 onto the rotating shaft 3a with the method of the first example shown in FIG. 2, the pre-assembled seal ring 13 and the slinger 14 are assembled in the prescribed position between the inner peripheral surface of the edge of the outer ring 16 and the outer peripheral surface in the middle of the rotating shaft 3a, by means of a pressing jig 28 which can be displaced in the axial direction. On the tip end face (the left end face in FIG. 2) of the pressing jig 28, is respectively provided around the entire periphery, an abutting surface 29 on an end portion on the outer diameter side, for abutting against the end face of the outer ring 16, a pressing cylindrical section 30 on a portion towards the outer diameter from a diametrically intermediate portion, for pressing an edge portion on the outer diameter side of the side face of the seal ring 13, and a pressing face 31 on an end portion extending from the diametrically intermediate portion to the inner diameter side end, for pressing the sleeve 14.

In the case where the seal ring 13 and the slinger 14 are assembled in the prescribed position between the inner peripheral surface on the end of the outer ring 16 and the outer peripheral surface of the middle section of the rotating shaft 3a, the seal ring 13 and the slinger 14 are pre-assembled as shown in FIG. 2. This assembly work is conducted at the factory where the seal ring 13 and the slinger 14 are manufactured, and the two components are then conveyed in the assembled condition to the factory where the water pump is manufactured. Therefore, during conveyance, the first and second seal lips 22 and 23 of the seal ring 13 are protected by the addition of packaging material as well as by the slinger 14, and thus the seal lips 22 and 23 are effectively protected.

Then the seal ring 13 and the slinger 14 pre-assembled as described above are pressed in the axial direction with the pressing jig 28 and assembled in the aforementioned prescribed position. In this case, the tip edge (the left edge in FIG. 2) of the pressing cylindrical section 30 is abutted against the edge portion on the outer diameter side of the side face of the seal ring 13, and the pressing surface 31 is abutted against one side face of the slinger 14. In this condition, a height difference L in the axial direction between the tip edge of the pressing cylindrical section 30 and the pressing surface 31 is regulated so that the amount of compression δ of the second seal lip 23 is a suitable value (H/10$\leq \delta \leq$7H/10). Here regulation of the amount of compression δ to the suitable value is performed by finally abutting the abutting surface 29 against the axial end face of the outer ring 16. Therefore the height difference L is determined in consideration of the portion of the elastic member 21 deformed towards the outer periphery. The seal ring 13 and the slinger 14 are pressed by the pressing jig 28 until the abutting surface 29 of the pressing jig 28 abuts against the axial end surface of the outer ring 16. This operation pushes the outer peripheral edge of the seal ring 13 into the attachment groove 19 formed around the inner peripheral surface of the end of the outer ring 16, and pushes the slinger 14 up to the prescribed position on the rotating shaft 3a (fastened onto the rotating shaft through interference fit). The seal ring 13 and slinger 14 are thus assembled into the prescribed position, and the amount of compression δ of the second seal lip 23 is at least 1/10 and up to 7/10 of the height H of the second seal lip 23 in the free condition.

Moreover, with the method of a second example shown in FIG. 3, a pressing jig 28a provided with a pressing cylindrical section 30a on the outer peripheral edge of the end face thereof is used. On the end face of this pressing jig 28a is respectively provided, a pressing surface 31a on a diametrically intermediate portion, for pressing the slinger 14, and an abutting surface 29a on a diametrically inner edge portion, for abutting against a step 32 formed in the outer peripheral surface of the middle portion of the rotating shaft 3a. In this example as well, in a condition with one side face of the seal ring 13 abutted against the tip end of the pressing cylindrical section 30a, and with one side face of the slinger 14 abutted against the pressing surface 31a, the height difference L in the axial direction between the tip end of the pressing cylindrical section 30a and the pressing surface 31a is regulated while taking into consideration the elastic deformation in the portion of the elastic member 21 closer to the outer periphery thereof, so that the amount of compression δ of the second seal lip 23 becomes a suitable value (H/10$\leq \delta \leq$7H/10). In examples wherein the pressing jig 28a is used, the seal ring 13 and the slinger 14 are pressed by the pressing jig 28a until the abutting surface 29a abuts against the step 32. This operation assembles the seal ring 13 and slinger 14 in the prescribed position in relation to the outer ring 16 and the rotating shaft 3*a*, and the amount of compression δ of the second seal lip 23 can be controlled to a suitable value (at least 1/10 and up to 7/10 the height of the second seal lip 23 in the free condition).

In this manner, with all of the methods, following pre-assembly of the seal ring 13 and the slinger 14, the seal ring 13 and the slinger 14 are assembled onto the outer ring 16 and the rotating shaft 3*a* in the prescribed position. Therefore the first and second seal lips 22 and 23 constituting the seal ring 13 are not readily contaminated or damaged prior to assembly. At the same time, the abutting surfaces 29 and 29*a* of the pressing jigs 28 and 28*a* are abutted against the outer ring 16 and the step 32, and when the pressing jigs 28 and 28*a* cannot be further displaced, the amount of compression of the second seal lip 23 in the axial direction is between 1/10 and 7/10 of the height of the second seal lip 23 in the free condition. Therefore the operation for suitable elastic deformation of the second seal lip 23 can be readily conducted with an industrial method.

According to the seal apparatus for a water pump having the aforementioned construction and assembled with the aforementioned method of assembly, it is possible to effectively prevent foreign matter such as steam or hot water from entering the rolling bearing unit 6*a* that supports the rotating shaft 3*a* of the water pump, over a long period of time.

First, the reason that it is possible to improve the seal performance to prevent entry of foreign matter will be explained.

Firstly, since the second seal lip 23 is increasingly tilted out in the radial direction as it becomes closer to the tip edge, it is possible to ensure a superior effect against entry of foreign matter. In other words, when foreign matter attempting to enter the rolling bearing unit 6*a* enters the space 27 on the outside of the second seal lip 23 through the gap between the tip edge of the outer diameter side cylindrical portion 26 and the main portion of the seal ring 13, it presses against the outer peripheral surface of the second seal lip 23. This pressure acts in the direction that pushes the tip edge of the second seal lip 23 against the outside surface of the slinger 14. Therefore it becomes very difficult for gaps to occur in the section between the tip edge of the second seal lip 23 and the outside surface of the slinger 14.

Furthermore, if this section is exposed to (attacked by) high-temperature steam, and coolant water containing condensed chemicals such as anti-freezing agent or anti-corrosion agent, the second seal lip 23 swells due to the synergistic action of these two substances (steam and coolant water) and deforms in the circumferential direction in a wave form. Thus, even when gaps occur in a few places in the area of sliding contact between the tip edge of the second seal lip 23 and the outside surface of the slinger 14, and foreign matter attempts to enter the rolling bearing unit 6*a*, the foreign matter is thrown outward in the radial direction from the gap, by the centrifugal force applied to the foreign matter by contact with the outside surface of the slinger 14 rotating together with the rotating shaft 3*a*. As mentioned above, the inner diameter $R_{26}$ of the outer diameter side cylindrical portion 26 provided on the outer peripheral edge of the slinger 14 is larger than the outer diameter $D_{23}$ of the second seal lip 23 under elastic deformation in an arc-shape (curl shape) in cross section, and thus there is a sufficient gap between the tip edge of the second seal lip 23 and the inner peripheral surface of the outer diameter side cylindrical portion 26 to discharge the foreign matter. Therefore the foreign matter is efficiently discharged and effectively prevented from progressing into the rolling bearing unit 6*a*.

Secondly, since the amount of compression δ of the second seal lip 23 is ensured as at least 1/10 the height H of the second seal lip 23 in the free condition ($\delta \geq H/10$), it is possible to ensure the contact pressure at the area of sliding contact between the tip edge of the second seal lip 23 and the outside surface of the slinger 14, that occurs due to the elastic deformation of the second seal lip 23. Therefore it is difficult for gaps to occur at the area of sliding contact, making it possible to improve the seal performance. By ensuring the amount of compression δ of the second seal lip 23 is at least 2/10 the height H of the second seal lip 23 in the free condition ($\delta > 2H/10$), it is possible to further effectively improve the seal performance.

Next, the reason that it is possible to ensure the above-mentioned effect of preventing entry of foreign matter over a long period of time, and improve durability, will be explained.

Firstly, since the amount of compression δ of the second seal lip 23 is kept to no more than 7/10 of the height H of the second seal lip 23 in the free condition ($\delta \leq 7H/10$), it is possible to prevent the contact pressure at the area of sliding contact between the tip edge of the second seal lip 23 and the outside surface of the slinger 14, due to the elastic deformation of the second seal lip 23, from becoming excessively large. Therefore, it is possible to suppress friction at the area of contact and to keep wear of the tip edge of the second seal lip 23 to a minimum.

Secondly, the arithmetic mean roughness Ra of the outside surface of the slinger 14 in contact with the tip edge of the second seal lip is regulated at from 0.2 μm to 2.0 μm, or the maximum height Ry is regulated at from 0.8 μm to 8.0 μm (by keeping the value of at least one of the arithmetic mean roughness Ra and the maximum height Ry within the aforementioned range, the surface is a smooth surface with little roughness). Therefore the tip edge does not rub forcibly against the outside surface, and it is possible to keep wear of the tip edge to a minimum. If the arithmetic mean roughness Ra of the outside surface exceeds 2.0 μm, or the maximum height Ry exceeds 8.0 μm, wear of the tip edge becomes severe and it becomes difficult to sufficiently ensure durability. On the other hand, if the arithmetic mean roughness Ra is less than 0.2 μm, or the maximum height Ry is less than 0.8 μm, the processing cost greatly increases, but improved durability cannot be expected.

In addition to regulating the surface roughness of the outside surface of the slinger 14 as mentioned above, the slinger 14 is made of anti-corrosive metal plate as mentioned before, such that the surface of at least the section where the tip edge of the second seal lip 23 comes into sliding contact does not corrode. Therefore roughness of the outside surface does not become worse due to corrosion, and it is possible to maintain the function of preventing wear over a long period of time.

In this way, wear of the tip edge of the second seal lip 23 is suppressed. Therefore even when the water pump is used over a long period of time, proper contact is maintained at the area of sliding contact between the tip edge of the second seal lip 23 and the outside surface of the slinger 14, and it is possible to ensure the seal performance at this area of sliding contact. It is necessary to keep at least either the value of the arithmetic mean roughness Ra or the maximum height Ry within the aforementioned respective ranges. However, it is possible to further improve durability by keeping both values within the aforementioned ranges.

Figure 4:
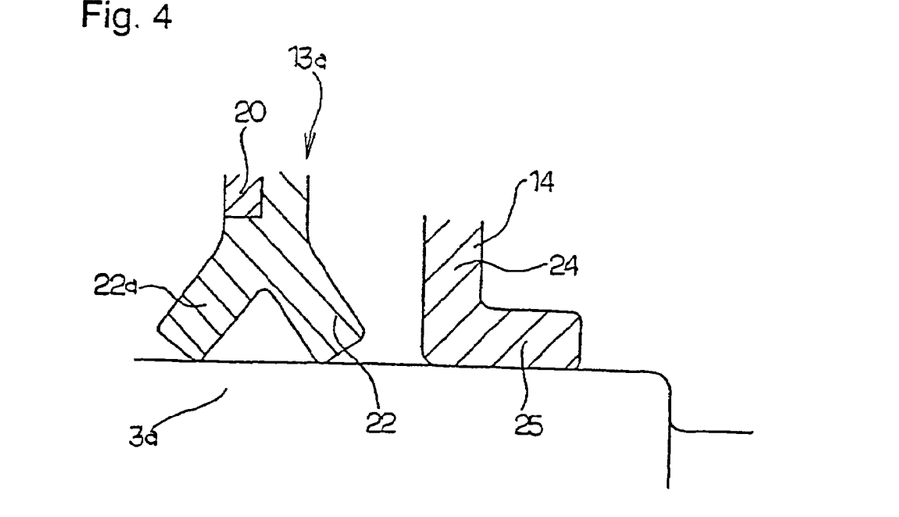
FIG. 4 is a partial cross-sectional view showing a first example of the construction covered by the method of assembly of the present invention, corresponding to portion B of FIG. 1.

Next, FIG. 4 shows a second example of the construction to which the method of assembly of the present invention is applied. The seal ring 13 of the first example of the construction to which the method of assembly of the present invention described above is applied, is provided with only one first seal lip 22 for sliding contact with the outer peripheral surface of the rotating shaft 3a. On the other hand, in this case of the seal ring 13a in the second example, two first seal lips 22 and 22a tilted in opposite directions to each other are provided. The first seal lip 22a tilting outward in the axial direction as it extends toward the inner diameter side has an excellent operation and effect in relation to preventing leakage of grease to inside the rolling bearing unit. As with the first example shown in FIG. 1, the method of assembly for the construction of the second example is substantially the same as shown in FIG. 2 and FIG. 3.

Figure 5:
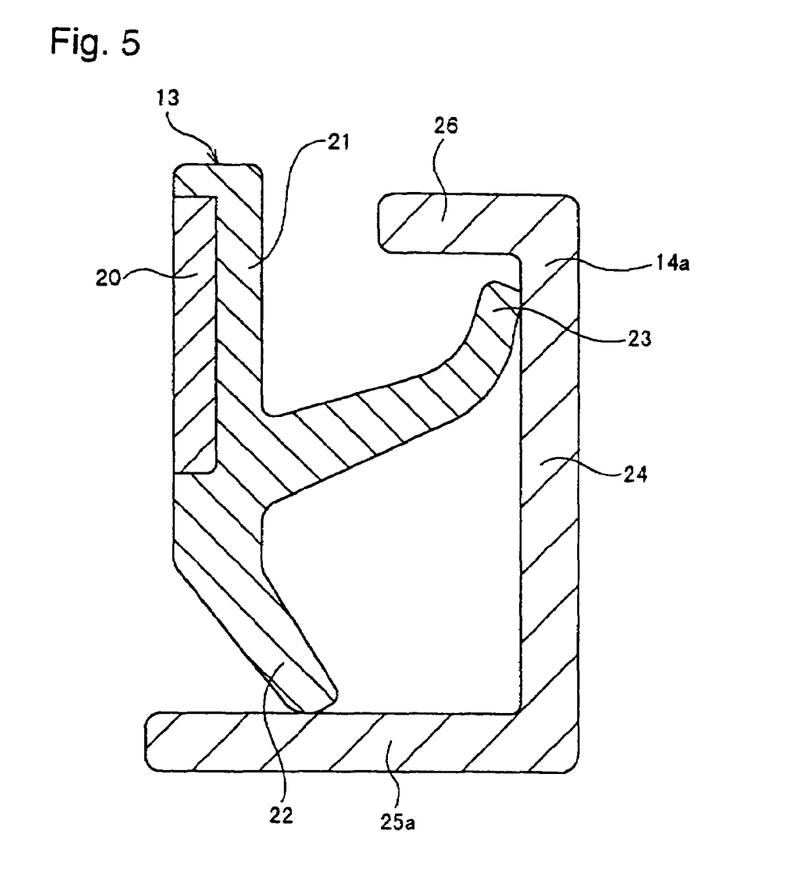
FIG. 5 shows a third example of the construction covered by the method of assembly of the present invention, being similar to FIG. 4.
Figure 6:
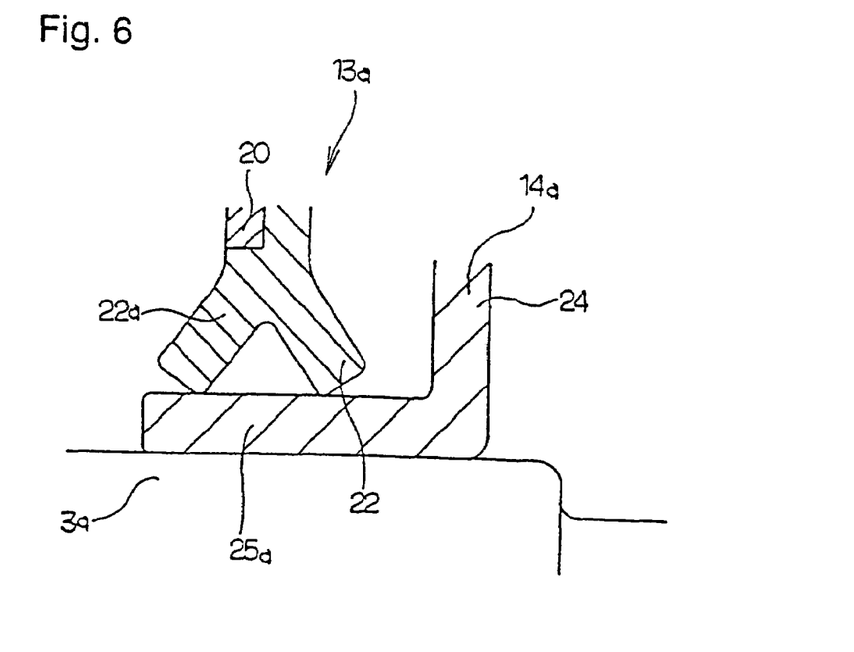
FIG. 6 shows a fourth example of the construction covered by the method of assembly of the present invention, being similar to FIG. 4.

Next, FIG. 5 shows a different shape of the seal ring 13 and slinger 14, as a third example of the construction to which the method of assembly of the present invention is applied. In the case of the construction shown in FIG. 5, a slinger 14a is formed with an inner diameter side cylindrical section 25a and an outer diameter side cylindrical section 26 which are bent in the same direction in relation to the circular section 24. Moreover, the inner peripheral edge of the first seal lip 22 constituting the seal ring 13 is in sliding contact with the outer peripheral surface of the inner diameter side cylindrical section 25a. In the case of this construction as well, the inner peripheral edge of the seal ring can be provided with two first seal lips 22 and 22a as in FIG. 6 showing a fourth example of a construction to which the method of assembly of the present invention is applied.

Figure 7:
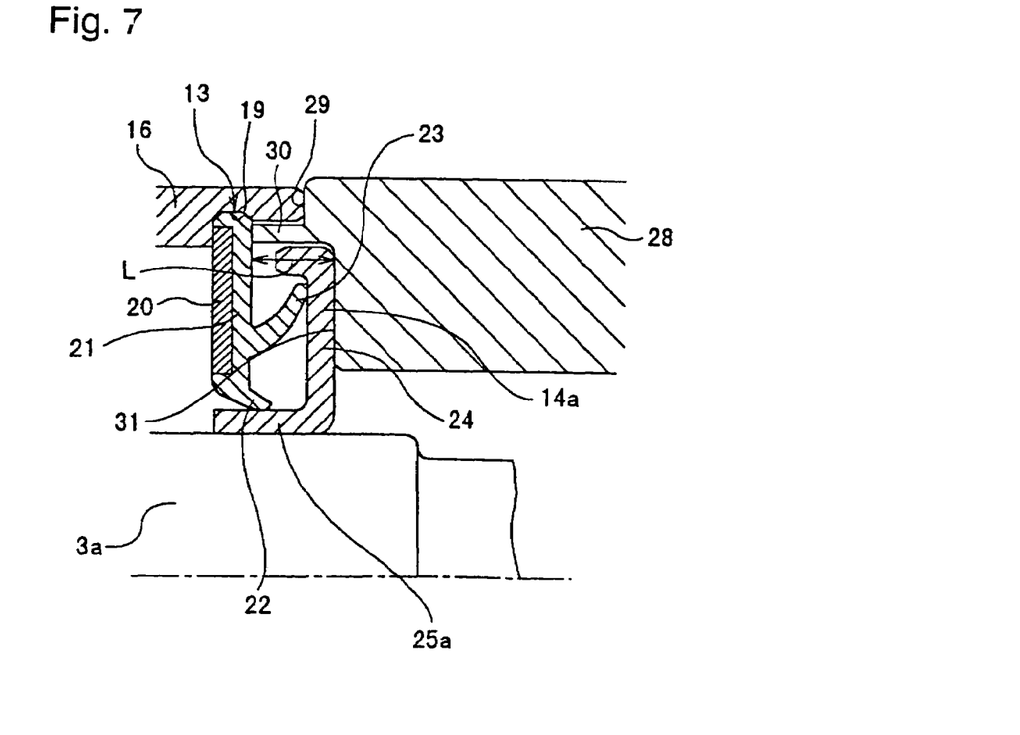
FIG. 7 is a partial cross-sectional view showing a third example of an embodiment of the method of assembly of the present invention.
Figure 8:
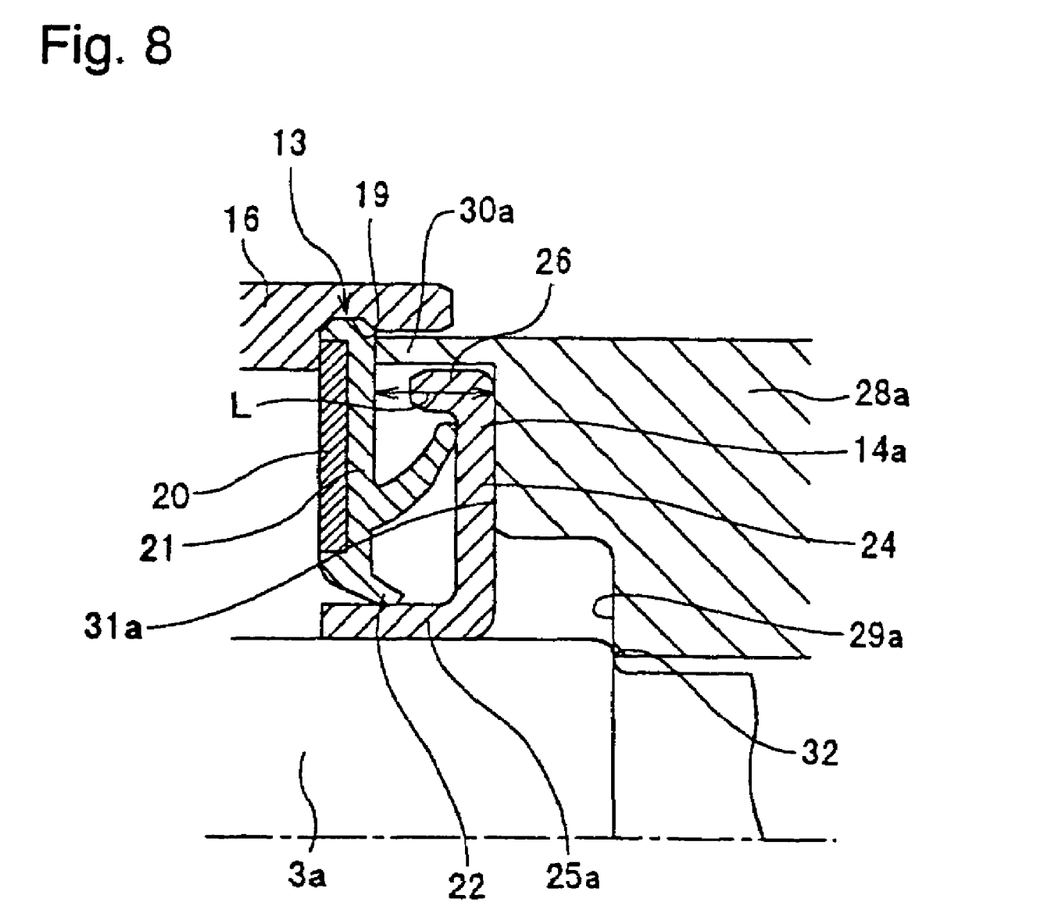
FIG. 8 is a partial cross-sectional view showing a fourth example of an embodiment of the method of assembly of the present invention.

The slinger 14a and the seal ring 13 of such a construction are assembled as shown in FIG. 5, at the factory wherein the seal ring 13 and the slinger 14 are manufactured. Therefore, in this example, the first and second seal lips 22 and 23 are covered by the slinger 14a in a pre-assembly condition, and contamination of, or damage to, both seal lips 22 and 23 can be effectively prevented. Then when assembled in the space between the inner peripheral surface on the end of the outer ring outer ring 16 and the middle of the outer peripheral surface of the rotating shaft 3a, the slinger 14a is pressed by the pressing jigs 28 and 28a with the inner diameter side cylindrical section 25a inserted in the inside of the seal lip 22 as shown in FIG. 7 and FIG. 8. By regulating the height difference L in the axial direction between the tip edge of the pressing cylindrical sections 30 and 30a of the pressing jigs 28 and 28a and the pressing surfaces 31 and 31a while taking into consideration the amount of elastic deformation of the portion of the elastic member 21 closer to the outer periphery thereof, regulation of the amount of compression δ of the second seal lip 23 is substantially the same as with the method of assembly noted above in FIG. 2 and FIG. 3.

When implementing the present invention, it is preferable that the hardness (Shore hardness) of the second seal lip 23 is regulated to between Hs50 and Hs90. The reason for this is to maintain the yield of the seal rings 13 and 13a, while giving suitable rigidity to the second seal lip 23, and to give a suitable contact pressure at the area of sliding contact between the tip edge of the second seal lip 23 and the outside surface of the circular section 24 of the slingers 14 and 14a. If the hardness of the second seal lip 23 is too low (less than Hs50), the contact pressure at the area of sliding contact is insufficient due to the hardness of the second seal lip 23 being too low, and it becomes difficult to ensure sealing performance.

On the other hand, if the hardness of the second seal lip 23 is too high (in excess of Hs90), then at the time of molding the elastic member 21 including the second seal lip 23, it becomes difficult to remove the second seal lip 23 from the mold, due to the hardness of the second seal lip 23 being too high. As a result, the second seal lip 23 is readily torn off, or the like, so that yield for the seal rings 13 and 13a deteriorates. Conversely, if the hardness of the second seal lip 23 is regulated to between Hs50 and Hs90, the yield for the seal rings 13 and 13a is maintained, and the required sealing performance can be ensured. For the same reason, it is preferable that the hardness of the first seal lip 22, as well, be regulated to between Hs50 and Hs90.

Figure 9:
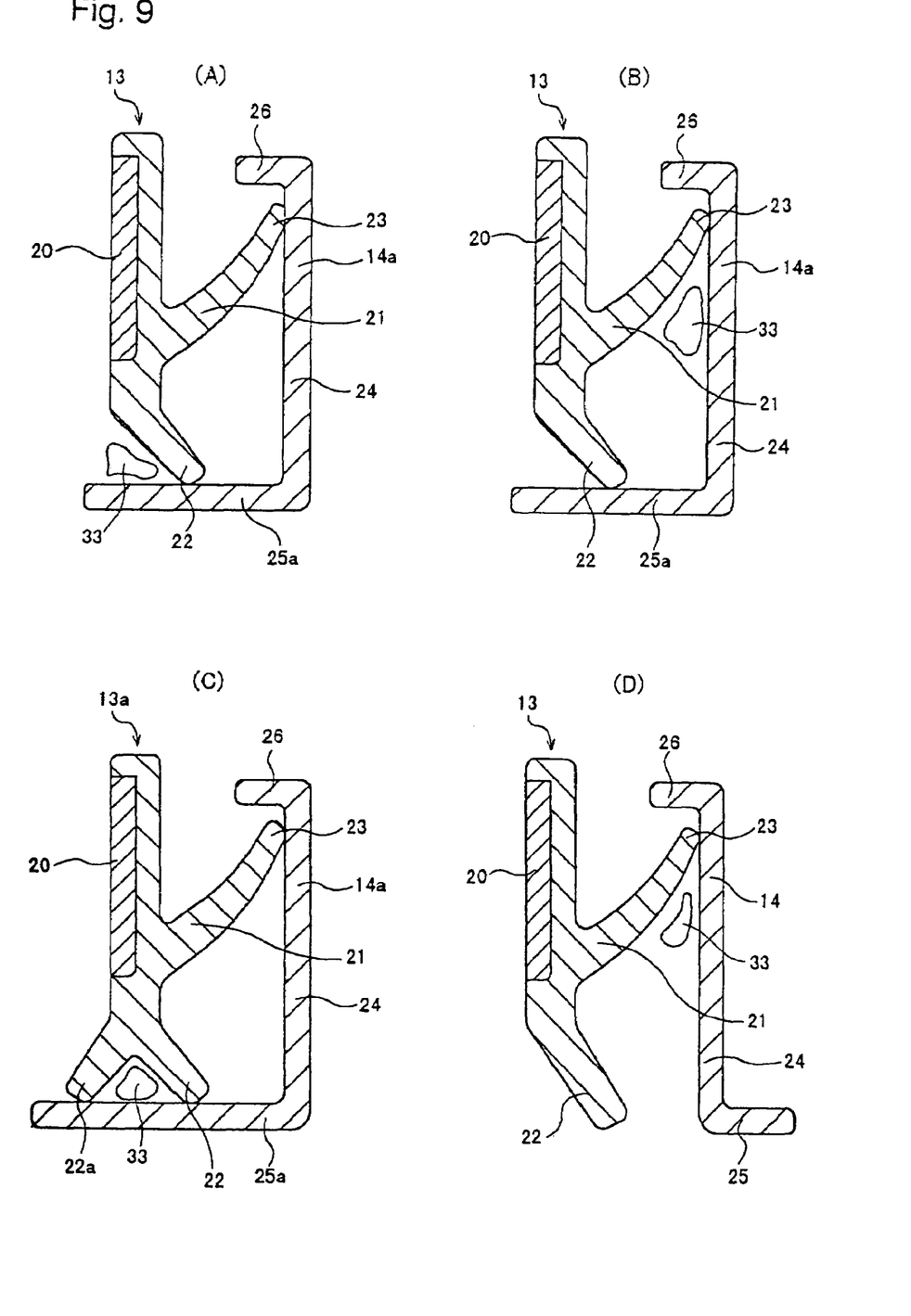

Furthermore, when implementing the present invention, it is preferable that grease 33 be applied to part of the seal rings 13 and 13a as shown in FIG. 9 (A) through FIG. 9(D), following pre-assembly (or during assembly) of the seal rings 13 and 13a and the slingers 14 and 14a. Then the assembled seal rings 13 and 13a and the slingers 14 and 14a are assembled into the space between the inner peripheral surface of the outer ring 16 or of the housing 1 and the outer peripheral surface of the rotating shaft 3a. As shown in FIG. 9 (A) through FIG. 9(D), the grease 33 is applied in the vicinity of the tip of the first and second seal lips 22, 22a, and 23, in other words, in the vicinity of the area of sliding contact between the tip edges of the first and second seal lips 22, 22a, and 23 and the mating surfaces. Application of grease between both peripheral surfaces in this manner 33 prior to assembly facilitates application, while ensuring that grease is applied reliably in the required locations.

INDUSTRIAL APPLICABILITY

The present invention is constructed and operates as described above. Therefore, the construction can be assembled at low cost by an industrial method, without increased cost or size, and water pump durability can be improved.

The invention claimed is:

1. A method of assembly for a rotation support apparatus for a water pump; the rotation support apparatus comprising an outer ring having an outer ring raceway on an inner peripheral surface, a rotating shaft constituting the water pump and having an inner ring raceway on an outer peripheral surface, a plurality of rolling elements provided between the outer ring raceway and the inner ring raceway such that they can rotate freely, a seal ring with an outer peripheral edge fastened to an inner peripheral surface on an end of said outer ring, and a slinger having a radially extending side with an outer edge thereof extending axially outward to form an outer diameter side cylindrical section, the slinger being fitted onto said rotating shaft, said seal ring having a first seal lip in sliding contact with an outer peripheral surface of said rotating shaft or of said slinger, and a second seal lip in sliding contact with one side face of the radially extending side of said slinger, wherein when assembling said rotation support apparatus, said seal ring and slinger are pre-assembled beforehand for assembly between the inner peripheral surface of said outer ring and the outer peripheral surface of the rotating shaft, and then installed in this assembled condition between both peripheral surfaces, wherein when said slinger is fitted onto said rotating shaft, a pressing jig abuts both a side face of said slinger and a side face of an elastic member of the seal ring, the pressing jig being displaced in the axial direction until the elastic member of the seal ring is pushed into an attachment groove formed around the inner peripheral surface of the end of the outer ring, and until a part of said pressing jig abuts with a part of said outer ring or with a step formed on the outer peripheral surface of the middle section of said rotating shaft, such that the seal ring and slinger are assembled in a prescribed position in relation to the outer ring and the rotating shaft, an amount of compression of the second seal lip in sliding contact with the one side face of the slinger is controllable to a suitable value, and no interference occurs between a tip end edge of the second seal lip and an inner peripheral surface of the outer diameter side cylindrical section.

2. The method according to claim 1, wherein prior to assembly of the seal ring and slinger, grease is applied to part of said seal ring.

* * * * *